US008777534B2

(12) United States Patent
Wallbaum et al.

(10) Patent No.: US 8,777,534 B2
(45) Date of Patent: Jul. 15, 2014

(54) CONNECTION SYSTEM OF A HOUSING OF A PLUG CONNECTOR HAVING A NUT

(75) Inventors: Olaf Wallbaum, Detmold (DE); Jens Gerullis, Lemgo (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 139 days.

(21) Appl. No.: 13/410,192

(22) Filed: Mar. 1, 2012

(65) Prior Publication Data

US 2012/0230797 A1 Sep. 13, 2012

(30) Foreign Application Priority Data

Mar. 3, 2011 (DE) ........................ 10 2011 001 079

(51) Int. Cl.
*F16B 37/04* (2006.01)

(52) U.S. Cl.
USPC ........................................... 411/103; 411/114

(58) Field of Classification Search
USPC ......... 411/103, 114, 116, 122, 128, 138, 145, 411/163, 550, 553, 962, 963, 977, 978; 439/321
See application file for complete search history.

(56) References Cited

U.S. PATENT DOCUMENTS

| | | | | |
|---|---|---|---|---|
| 4,030,798 | A * | 6/1977 | Paoli | 439/321 |
| 4,359,254 | A * | 11/1982 | Gallusser et al. | 439/321 |
| 4,536,048 | A * | 8/1985 | Schildkraut et al. | 439/312 |
| 5,399,096 | A * | 3/1995 | Quillet et al. | 439/321 |
| RE35,937 | E * | 10/1998 | DiStasio | 411/329 |
| 6,036,236 | A * | 3/2000 | Bensel | 285/89 |
| 6,227,782 | B1 * | 5/2001 | Bowling et al. | 411/114 |
| 7,033,195 | B2 * | 4/2006 | Murphy et al. | 439/307 |

FOREIGN PATENT DOCUMENTS

| | | | |
|---|---|---|---|
| DE | 32 09 734 | A1 | 9/1983 |
| DE | 32 09 734 | C2 | 9/1983 |
| DE | 10 2006 007 191 | A1 | 8/2007 |

* cited by examiner

*Primary Examiner* — Gary Estremsky
(74) *Attorney, Agent, or Firm* — Knobbe, Martens, Olson & Bear LLP

(57) ABSTRACT

In the case of a connection system having a housing (10) and a nut (16) which can be arranged on the housing (10), the aim is to provide a solution by means of which it is possible to prevent the nut (16) from being released inadvertently from the housing (10). This is intended to be achieved in that the nut (16) is formed from an elastic material and latching elements (24) are formed on the nut (16), which latching elements (24) can be latched to mating latching elements (26) which are formed on the housing (10).

8 Claims, 2 Drawing Sheets

CONNECTION SYSTEM OF A HOUSING OF A PLUG CONNECTOR HAVING A NUT

CROSS-REFERENCE TO RELATED APPLICATIONS

This application claims priority to German Patent Application Number DE 10 2011 001 079.3, entitled VERBINDUNGSSYSTEM EINES GEHÄUSES EINES STECKVERBINDERS MIT EINER MUTTER, and filed on Mar. 3, 2011, the entire contents of which is hereby incorporated herein by reference.

BACKGROUND OF THE INVENTION

1. Field of the Invention

The invention relates to a connection system having a housing and having a nut which can be arranged on the housing. The invention also relates to a plug connector having a connection system such as this.

2. Description of the Related Art

By way of example, the housing may be used to hold one or more contact elements which are connected, making contact, to one or more conductors of a cable in the housing. After the conductors in the cable have been connected to the contact elements, a nut, also referred to as a union nut, is normally screwed onto the housing, and is tightened with a specific torque. For this purpose, the nut normally has a sleeve body with an internal thread, with a hexagonal body being arranged on the sleeve body, by means of which the nut can be attached to and released from the housing. Inter alia, the nut is used to seal the housing in the area of the contact with the conductors in the inserted cable, with the contacts, against moisture and dust. Furthermore, the nut can provide strain relief for the conductors in the cable, when contact has been made.

SUMMARY OF THE INVENTION

The invention is based on the object of providing a solution, by means of which it is possible to prevent the nut from being inadvertently released from the housing.

In the case of a connection system of the type referred to in more detail initially, this object is achieved according to the invention in that the nut is formed from an elastic material and latching elements are formed on the nut, which latching elements can be latched to mating latching elements which are formed on the housing.

The problem is also solved by a plug connector comprising a connection system a housing and a nut which can be arranged on the housing, wherein the nut is formed from an elastic material and latching elements are formed on the nut, which latching elements can be latched to mating latching elements which are formed on the housing.

Expedient refinements and advantageous developments of the invention are specified in the dependent claims.

The embodiment according to the invention of latching elements on the nut and mating latching elements on the housing, which can be latched to one another, makes it possible to provide a secure connection between the nut and the housing, which prevents the nut being inadvertently released, in particular by hand, from the housing. When the nut is screwed onto the housing, the latching elements on the nut hook into or latch with the mating latching elements on the housing. The latching means that the nut cannot be released from the housing simply by unscrewing the nut from the thread on the housing, since the latching prevents this. The latching must therefore first of all be released, before unscrewing, by unhooking the latching elements from the mating latching elements. For this purpose, the nut is formed from an elastic material, which is elastically deformable, for example a plastic. In order to release the latching, the longitudinal side surfaces of the nut are pressed in the direction of the center axis of the nut, allowing the latching elements to be unhooked from the mating latching elements. As soon as the latching elements and the mating latching elements no longer engage in one another, the nut can be unscrewed from and/or pulled off the housing. In this case, despite its elasticity, the material of the nut is preferably designed to have a stiff shape, in such a way that the nut can be compressed by its longitudinal side surfaces only by means of a tool, which is pushed along the longitudinal side surfaces of the nut, over the outer circumferential surface of the nut, thus compressing it.

According to one preferred refinement of the invention, the latching elements are arranged in an annular shape on the nut, and the mating latching elements are arranged in an annular shape on the housing. The annular arrangement is preferably provided in this case around the entire circumferential surface of the nut and of the housing, thus allowing the nut to be attached or latched to the housing particularly securely.

The latching elements are preferably arranged on the outer circumferential surface of the nut. The latching elements are therefore preferably formed on a different surface of the nut than the thread or the internal thread of the nut, by means of which the nut is screwed onto the housing or the thread on the housing. The arrangement of the latching elements and of the thread on different surfaces allows the thread and the latching elements to be operated independently of one another, without them influencing one another.

Provision is preferably furthermore made for an annular element to be formed on an outer circumferential surface of the housing, with the mating latching elements being arranged on an inner surface of the annular element. The provision of an additional annular element, on which the mating latching elements are arranged, makes it possible to prevent the mating latching elements from being arranged in the area of the thread, in particular of the external thread, on the housing, via which the nut is screwed onto the housing. This makes it possible to prevent the thread which is arranged on the housing and the mating latching elements which are arranged on the housing from influencing one another when the nut is being attached to or released from the housing. In this case, the annular element is preferably arranged underneath the thread which is formed on the housing, in the direction in which the nut is attached to the housing. The annular element preferably at the same time forms a step or collar which is circumferential around the outer circumferential surface of the thread, on which the nut can rest when attached to the housing, and can thus be supported. This makes it possible to further improve the attachment of the nut to the housing.

Furthermore, the latching elements and the mating latching elements are preferably in the form of wedges, at least in sections. The configuration of the latching elements and of the mating latching elements in the form of wedges is preferably designed such that, when the nut is rotated in order to attach the nut to the housing, the latching elements can slide over the mating latching elements, in that the flanks or longitudinal side surfaces of the wedge-shaped latching elements and mating latching elements, which are provided with a gradient >0°, can slide on one another. As soon as the rotation direction of the nut is changed from screwing the nut onto the housing to an opposite rotation direction for unscrewing the nut from the housing, the latching elements are hooked to the mating latching elements, in that the end surfaces, which are straight, of the wedge-shaped latching elements and mating latching elements abut against one another, thus preventing them from sliding on one another. This allows the nut to be attached to the housing without major effort, while at the same time preventing the nut being inadvertently released or unscrewed from the housing.

According to a further preferred refinement of the invention, at least two operating elements for holding a tool are arranged on the outer circumferential surface of the nut. The formation of operating elements on the nut makes it possible to simplify the compression of the nut on its longitudinal side surfaces in order to release the latching, in that the tool presses onto the operating elements in order to release the latching, thus allowing the longitudinal side surfaces or the outer circumferential surface of the nut to be compressed in the direction of its center axis, without a large amount of force being applied. The operating elements are preferably in the form of blocks or boxes, and are arranged distributed in a circular shape around the outer circumferential surface, which runs on the longitudinal side, of the nut. In this case, six operating elements are preferably arranged on the outer circumferential surface, thus allowing the latching to be released via the operating elements, for example by means of a hexagonal wrench.

The operating elements are preferably connected to one another in pairs, such that two operating elements which are arranged alongside one another are connected to one another, for example via a web. The connection of the operating elements in pairs makes it possible to reduce the force which has to be applied by a tool to the operating elements. Furthermore, the robustness and wear resistance of the operating elements is improved.

In order to make it easier to push a tool onto the operating elements for operation of the operating elements, it is preferable for the operating elements to have an operating surface with a gradient >0°. The operating surface is that surface via which operating elements are operated by means of the tool. The gradient of the operating surface in this case increases in the direction of the attachment direction of the nut. The operating element or the operating surface of the operating element is therefore preferably conical.

According to a further advantageous refinement of the invention, the nut has an inner ring and an outer ring, which is arranged parallel to the inner ring and on which the latching elements are formed, with the outer ring being formed at a distance from the inner ring. The thread of the nut is preferably formed on the inner ring. The formation of an outer ring and of an inner ring allows the latching elements and, if appropriate, the operating elements to be arranged physically separately from the thread on the nut. The arrangement at a distance results in a gap being formed between the inner ring and the outer ring. The gap means that the elasticity of the nut can be increased, particularly in the area of the toothed elements and, if appropriate, of the operating elements which are arranged on the outer ring, thus making it possible to simplify the release of the latching of the latching elements to the mating latching elements by means of a tool, since, because of the gap, less force need be applied to compress the nut in the direction of its center axis, with the outer ring being deformed via the gap in the direction of the inner ring. Simultaneous deformation of the inner ring and therefore of the nut thread formed on the inner ring can therefore be prevented.

BRIEF DESCRIPTION OF THE DRAWINGS

The invention will be explained in more detail in the following text on the basis of one preferred embodiment, and with reference to the attached drawings, in which.

DETAILED DESCRIPTION OF THE PREFERRED EMBODIMENT

Figure 1:
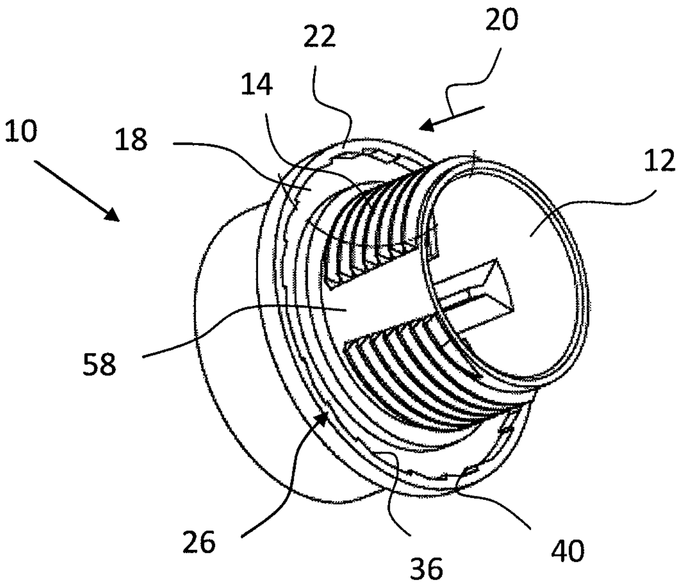
FIG. 1 shows a schematic illustration of a housing of a connection system according to the invention.
Figure 3:
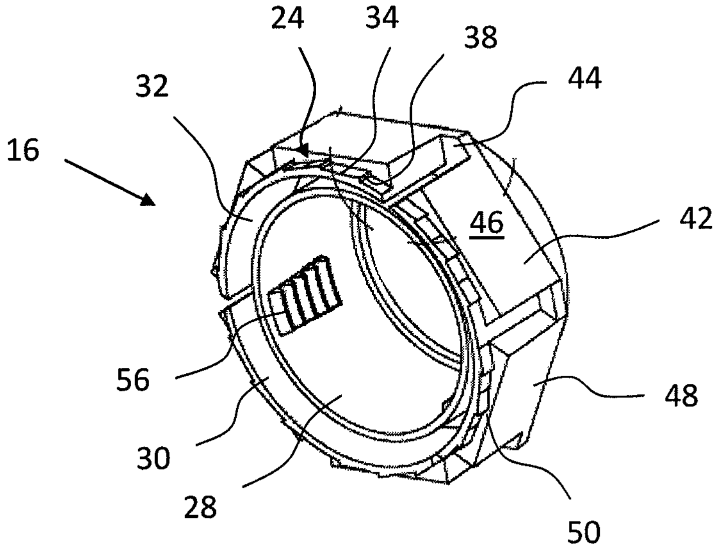
FIG. 3 shows a schematic illustration of a nut of a connection system according to the invention.
Figure 4:
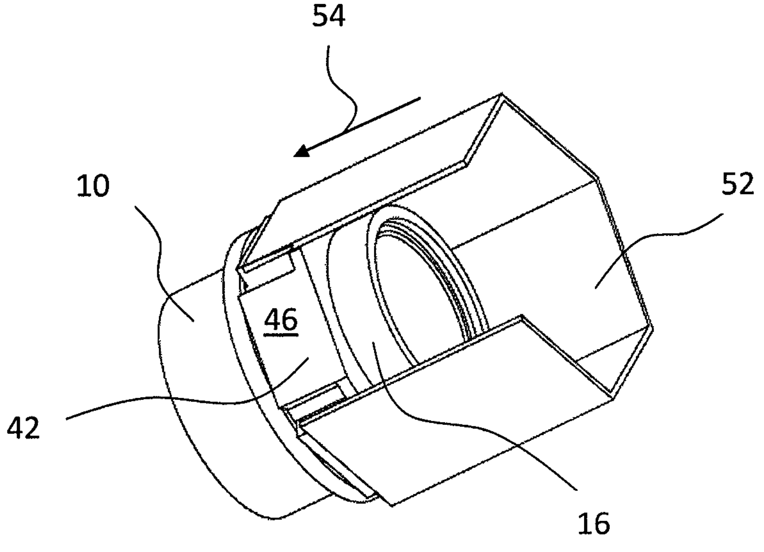
FIG. 4 shows a schematic illustration of a connection system according to the invention having a housing as shown in FIG. 1 and having a nut as shown in FIG. 3, and having a tool, fitted to the nut, in order to release the nut.

FIG. 1 schematically illustrates a housing 10, for example a housing of a plug connector. The housing 10 is cylindrical with an internal area 12 for holding, for example, contact elements, which are not shown here, for making contact with conductors in a cable, which is not shown here. On its outer circumferential surface, the housing 10 has a thread 14 to which a nut 16, as shown in FIG. 3, can be attached by screwing it on. Furthermore, an annular element 18 in the form of an attachment or collar is integrally formed on the outer circumferential surface of the housing 10, with the annular element 18 projecting from the outer circumferential surface of the housing 10 and completely surrounding the outer circumferential surface, such that the annular element 18 forms a type of collar or step. The annular element 18 is formed underneath the thread 14 in the attachment direction 20 of the nut 16 on the housing 10, such that the nut 16 can rest on the annular element 18 when it is attached to housing 10, as is shown in FIG. 4. The annular element 18 has a circumferential outer edge 22, with mating latching elements 26, which engage in latching elements 24 that are formed on the nut 16, being formed on the inner surface, which faces in the direction of the thread 14, of the edge 22 of the annular element 18. The latching elements 24 and the mating latching elements 26 are in the form of latching teeth. A plurality of mating latching elements 26 which are arranged alongside one another are formed in an annular shape over the entire circumferential inner surface of the edge 22 of the annular element 18, with the mating latching elements 26 being in the form of wedges, at least in sections.

Figure 2:
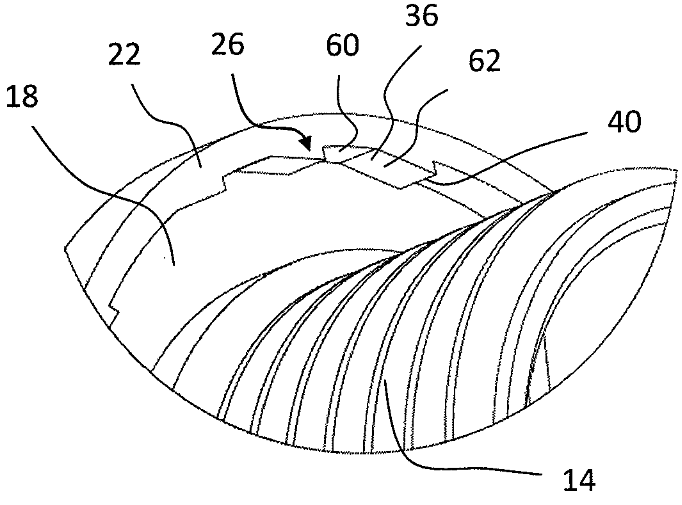
FIG. 2 shows a schematic detailed illustration of mating latching elements which are formed on the housing.

FIG. 2 shows a detailed illustration of the mating latching elements 26 of the housing 10, in this case showing that the mating latching elements 26 each have a first section 60 and a second section 62, with the second section 62 being in the form of a wedge, that is to say the longitudinal side surfaces 36 of the mating latching elements 26 are provided with a gradient >0°. The first section 60, or the longitudinal side surface of the first section 60, is in contrast formed with a gradient =0°. The latching is created as soon as the corresponding latching element 24 on the nut 16 has been passed over the first section 60 and then over the second section 62, and latches on the end surface 40 of the mating latching element 26 on the second section 62. The latching elements 24 of the nut 16 preferably likewise each have a first section with a longitudinal side surface with a gradient =0° and a second section, arranged following this, with a wedge-shaped longitudinal side surface with a gradient >0°. The formation of a first section 60 such as this in addition to the second section 62 makes it possible to lengthen the sliding movement of the latching elements 24 along the mating latching elements 26 before latching.

FIG. 3 schematically illustrates a nut 16 according to the invention. The nut 16 is formed from an elastic material and has an inner ring 28 and an outer ring 30, which is parallel to the inner ring 28, with the inner ring 28 being arranged at a distance from the outer ring 30, such that a gap 32 is formed between the inner ring 28 and the outer ring 30. The latching elements 24 for securely latching the nut 16 to the housing 10 are formed on the outer circumferential surface of the nut 16, to be precise on the outer circumferential surface of the outer ring 30, with the latching elements 24 being arranged in an annular shape alongside one another, in the same way as the mating latching elements 26 on the housing 10, and being in the form of wedges, at least in sections. The configuration of the latching elements 24 and of the mating latching elements 26 in the form of wedges at least in sections is designed such that, when the nut is rotated in order to attach the nut 16 to the housing, the latching elements 24 can slide over the mating latching elements 26, in that the flanks or longitudinal side surfaces 34, 36 of the wedge-shaped latching elements 24 and mating latching elements 26, which are provided with a gradient >0°, can slide on one another. As soon as the rotation direction of the nut 16 is changed from screwing the nut 16 onto the housing 10 to an opposite rotation direction in order to unscrew or release the nut 16 from the housing 10, the latching elements 24 hook onto the mating latching elements 26, by the straight end surfaces 38, 40 of the wedge-shaped latching elements 24 and mating latching elements 26 abutting against one another, and thus preventing them from sliding on one another.

Furthermore, six operating elements 42 are arranged in an annular shape around the outer circumferential surface of the nut 16, on the outer circumferential surface of the nut 16, to be precise on the outer circumferential surface of the outer ring 30, with two operating elements 42 in each case being connected to one another in pairs via a web 44. The operating elements 42 have an operating surface 46 which faces away from the nut 16 and to which a tool can be fitted in order to release the nut 16 from the housing 10, as is shown in FIG. 4. The operating surface 46 is conical, that is to say it has a gradient >0° from a first end 48 toward a second end 50, which is adjacent to the latching elements 24, as a result of which the gradient of the operating surface 46 increases from the first end 48 toward the second end 50. This makes it easier to push a tool 52 on in the pushing-on direction 54, since the operating surfaces 46 act as a type of guide for the tool 52.

As is also shown in FIG. 3, a partial thread 56 is formed on the inner surface of the inner ring 28, extending only over a small segment of the inner surface of the inner ring 28. The thread 14 on the housing 10 has a cutout 58, which is designed to correspond to the size of the partial thread 56, as a result of which, when the nut 16 is attached to the housing 10, the nut 16 need not be screwed on over the entire thread section of the thread 14, but can be plugged on and the nut 16 just has to be rotated through a turn of <180°, in order to be attached to the housing 10. This allows the nut 16 to be attached to the housing 10 considerably more easily and quickly.

FIG. 4 shows a connection system according to the invention, in which a nut 16, as shown in F*igure* 3, is attached to a housing 10, as shown in FIG. 1. In order to release the nut 16, which has been attached to the housing 10, a tool 52 in the form of a hexagonal wrench is pushed onto the operating surface 46 of the operating elements 42. When the tool 52 is pushed on in the pushing-on direction 54, the outer ring 30 of the nut 16 is compressed together with the latching elements 24 arranged thereon, in the direction of the inner ring 28, that is to say in the direction of the center of the nut 16, as a result of which the latching elements 24 can be released from being latched to the mating latching elements 26 on the housing 10, and can be unlatched, thus subsequently allowing the nut 16 to be unscrewed from and pulled off the housing 10.

LIST OF REFERENCE SYMBOLS

Housing 10
Internal area 12
Thread 14
Nut 16
Annular element 18
Attachment direction 20
Edge 22
Latching elements 24
Mating latching elements 26
Inner ring 28
Outer ring 30
Gap 32
Longitudinal side surface 34
Longitudinal side surface 36
End surface 38
End surface 40
Operating element 42
Web 44
Operating surface 46
First end 48
Second End 50
Tool 52
Pushing-on direction 54
Thread 56
Cutout 58
First section 60
Second section 62

What is claimed is:

1. A connection system, having
a housing; and
a nut which can be arranged on the housing,
wherein the nut is formed from an elastic material and latching elements are on an outer circumferential surface of the nut, which latching elements can be latched to mating latching elements on the housing,
wherein at least two operating elements for holding a tool are arranged on the outer circumferential surface of the nut, and
wherein the operating elements have an operating surface with a gradient >0°.

2. The connection system as claimed in claim 1, wherein the latching elements are arranged in an annular shape on the nut, and the mating latching elements are arranged in an annular shape on the housing.

3. The connection system as claimed in claim 1, wherein an annular element is formed on an outer circumferential surface of the housing, with the mating latching elements being arranged on an inner surface of the annular element.

4. The connection system as claimed in claim 1, wherein the latching elements and the mating latching elements comprise wedges.

5. The connection system as claimed in claim 1, wherein the operating elements are connected to one another in pairs.

6. The connection system as claimed in claim 1, wherein the nut has an inner ring and an outer ring, which is arranged parallel to the inner ring and on which the latching elements are formed, with the outer ring being formed at a distance from the inner ring.

7. A plug connector, having a connection system, having:
a housing; and
a nut which can be arranged on the housing, wherein the nut is formed from an elastic material and latching elements are on an outer circumferential surface of the nut, which latching elements can be latched to mating latching elements on the housing, wherein at least two operating elements for holding a tool are arranged on the outer circumferential surface of the nut, and wherein the operating elements have an operating surface with a gradient >0°.

8. A connection system, having a housing; and a nut which can be arranged on the housing, wherein the nut is formed from an elastic material and latching elements are on the nut, which latching elements can be latched to mating latching elements on the housing, wherein at least two operating elements for holding a tool are arranged on the outer circumferential surface of the nut, and wherein the operating elements have an operating surface with a gradient >0°.

* * * * *